United States Patent
McCarthy et al.

(10) Patent No.: US 7,407,909 B2
(45) Date of Patent: Aug. 5, 2008

(54) EX-SITU REDUCTION AND DRY PASSIVATION OF NOBLE METAL CATALYSTS

(75) Inventors: Stephen J. McCarthy, Center Valley, PA (US); Jean W. Beeckman, Columbia, MD (US); William G. Borghard, Haddon Heights, NJ (US); Sylvain Hantzer, Prairieville, LA (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 172 days.

(21) Appl. No.: 11/228,366

(22) Filed: Sep. 16, 2005

(65) Prior Publication Data

US 2006/0073965 A1    Apr. 6, 2006

Related U.S. Application Data

(60) Provisional application No. 60/615,016, filed on Oct. 1, 2004.

(51) Int. Cl.
*B01J 29/04* (2006.01)
*B01J 21/00* (2006.01)
*B01J 21/12* (2006.01)

(52) U.S. Cl. ............... 502/74; 502/85; 502/240; 502/245

(58) Field of Classification Search .......... 502/74, 502/85, 240, 245
See application file for complete search history.

(56) References Cited

U.S. PATENT DOCUMENTS

| 4,372,841 A | 2/1983 | Stuntz et al. ............ 208/113 |
| 2004/0200758 A1 | 10/2004 | Yang et al. ............ 208/208 R |

*Primary Examiner*—Elizabeth D. Wood
(74) *Attorney, Agent, or Firm*—Paul E. Purwin

(57) ABSTRACT

A method of ex-situ activation and dry passivation of supported noble metal catalysts including the steps of reducing in the presence of hydrogen and dry passivation by cooling in an inert atmosphere and exposing to air or by filling the pores of the catalyst with a low sulfur oil before exposing to air.

10 Claims, 4 Drawing Sheets

EX-SITU REDUCTION AND DRY PASSIVATION OF NOBLE METAL CATALYSTS

This application claims the benefit of U.S. Provisional application 60/615,016 filed Oct. 1, 2004.

BACKGROUND OF THE INVENTION

The present invention relates to methods for the ex-situ activation and passivation of catalysts. In particular, these methods relate to supported noble metal catalysts on mesoporous or zeolitic materials. These techniques also apply to all catalyst that absorb water and use supported noble metals.

In-situ nitrogen drying and hydrogen reduction of noble metal catalysts is sometimes difficult to implement in commercial plants. Catalysts must first be completely dried under inert gas ($N_2$) and then the water partial pressure must be maintained at extremely low levels during hydrogen reduction to prevent damaging highly dispersed noble metals. Commercial plants have a variety of treat gas compositions and limits on minimum operating pressures and purge gas rates. Therefore, for large catalyst volumes, in-situ activation can last for weeks and the success relies heavily on accurate treat gas dew point measurements, which can be quite unreliable. Also, Nitrogen for drying is not always available and the large volumes needed for adequate drying may be prohibitively expensive to purchase.

Ex-situ reduction and dry passivation eliminate the need for extensive in-situ treatment. This reduces start-up time and eliminates the potential to damage noble metal dispersion during commercial in-situ reduction in the presence of moisture.

Currently, most noble metal catalysts are loaded into the reactor with the metal in the oxide form and then the noble metals are activated/reduced in-situ in the commercial unit. As mentioned above, in-situ activations can last for weeks and the presence of excessive moisture during reduction can significantly damage noble metal dispersion. For limited applications, the noble metals are activated ex-situ and the reduced catalyst is immediately immersed into excess oil, wax or liquids, in an inert atmosphere, to passivate the noble metals. However, catalysts immersed in excess liquid are very difficult to handle and impossible to load into most multi-bed reactors.

SUMMARY OF THE INVENTION

The present invention is a process for the ex-situ reduction and dry passivation of a supported noble metal catalyst including a mesoporous or zeolitic matrix. The process includes the steps of reducing the catalyst and passivating the catalyst in the absence of excess liquid. In one preferred embodiment, the reduced catalyst is first cooled, in an inert atmosphere, and then exposed to air. In another preferred embodiment, the pores of the reduced catalyst may be filled with oil in an inert atmosphere. Since only the pores are filled with oil, the catalyst remains dry and free flowing.

In a preferred embodiment, the supported metal catalyst is palladium and platinum supported on MCM-41 bound with alumina, which is described in U.S. Pat. No. 5,098,684.

DETAILED DESCRIPTION OF THE PREFERRED EMBODIMENTS

Figure 1:
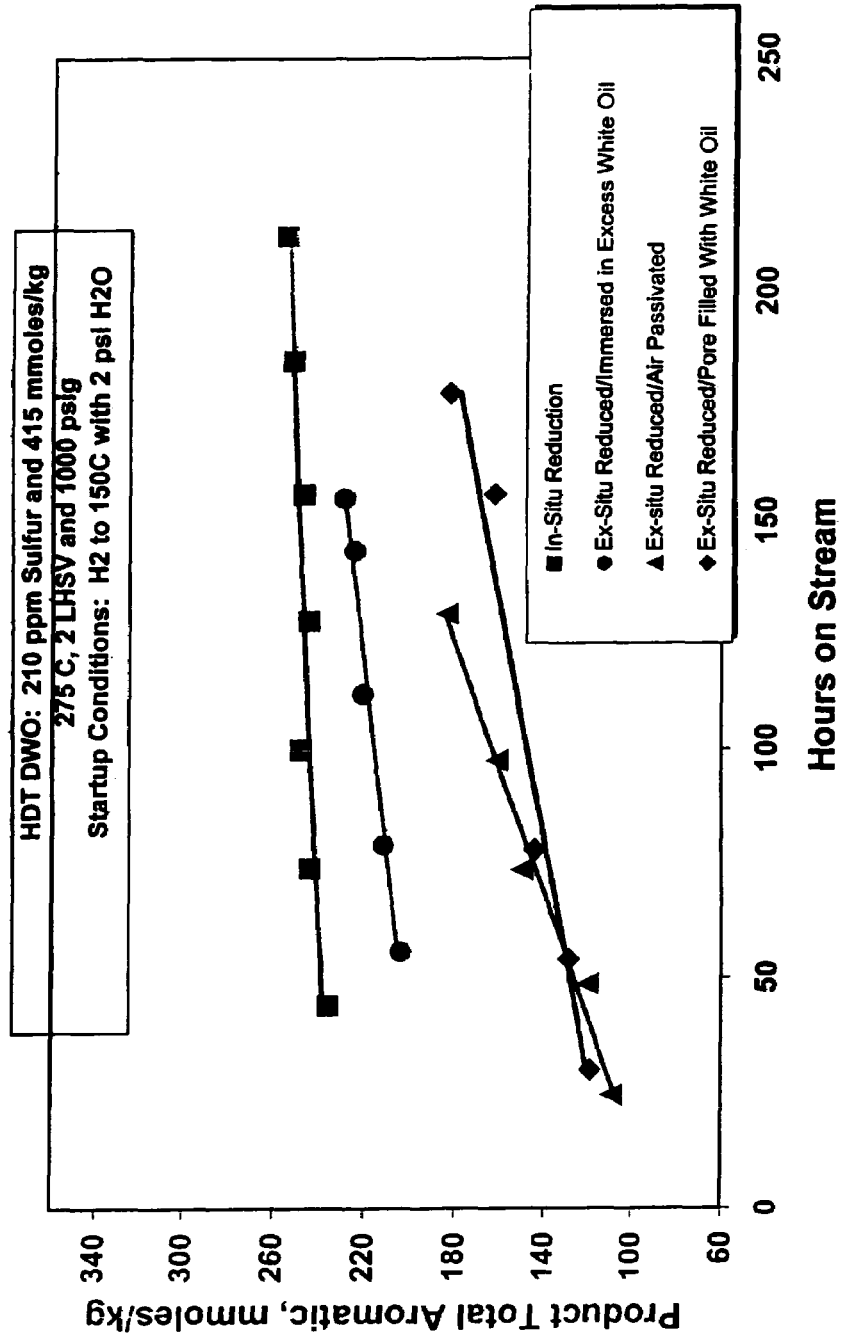
FIG. 1 shows a comparison of the performance of a palladium and platinum supported catalyst that was reduced in-situ versus ex-situ according to the present invention as in Example 2.

The present invention is a method of ex-situ activation and dry passivation of supported noble metal catalysts. The method comprises a two step procedure. First, the supported noble metal oxides are first dried and reduced in a single step in the presence of a mixture of hydrogen and inert gas. Second, the reduced catalyst is dry passivated by cooling in an inert atmosphere and then exposing to air or by filling the pores of the catalyst with a ultra low sulfur mineral oil before exposing to air. The passivated catalysts are dry and free flowing and can be easily loaded into a commercial reactor, heated in hydrogen to remove free water & oxygen of passivation, and then started on oil feed, without any further treatment.

Ex-situ reduction and passivation will reduce start-up time and eliminates the potential to damage noble metal dispersion during in-situ reduction in the presence of moisture. While ex-situ passivation of reduced catalysts in excess oil or wax has been practiced commercially, dry passivation with air or by oil-pore filling is novel and offers the advantage of a free flowing catalyst. Further, pilot plant data show that ex-situ reduced and dry passivated catalysts have equivalent performance as catalysts having been subjected to a controlled in-situ drying and reductions step using completely dry gases. The method described in the examples below is for palladium and platinum supported on MCM-41 bound with alumina.

EXAMPLE 1

In-Situ Reduction

The catalyst comprises 0.3 wt % platinum and 0.9 wt % palladium supported on MCM-41 bound with alumina. Platinum and palladium are highly dispersed on the surface of the catalyst support by first absorbing onto the support an aqueous solution of platinum and palladium tetrammine nitrate. After metals coating, the support is dried and then calcined in air to decompose the tetrammines, leaving behind finely dispersed platinum and palladium oxides. Prior to use, the catalyst must be activated by reducing the platinum and palladium oxides without damaging metal dispersion.

Current practice is to load such noble metal catalysts into the commercial reactor and first dry the catalyst in nitrogen and then reduce the noble metals in hydrogen. As shown in the Table 1 below, the catalyst must be completely dried in inert gas such as nitrogen prior to reduction and water partial pressure must be maintained at extremely low levels during hydrogen reduction to prevent damaging the dispersion of the noble metals, while the temperature must be at least 150° C. to fully reduce the noble metals.

TABLE 1

Effect of Drying Conditions

| | Drying | | | Hydrogen Reduction | | | |
|---|---|---|---|---|---|---|---|
| | Temp, C. | Time, hr | Water, psi | Temp, C. | Time, hr | Water, psi | Dispersion O/M |
| Successful | 85 | 12 | 0.09 | 240 | 9 | 0.09 | 0.60 |
| Insufficient Drying | 88 | 2 | 6 | 229 | 6 | 0.01 | 0.26 |
| High $P_{H2O}$ | 84 | 22 | 6 | 237 | 10 | 0.3 | 0.37 |

For some limited applications, the noble metals can be reduced ex-situ and the reduced catalysts immediately immersed into excess oil, wax, or other liquid (in an inert atmosphere) to passivate the noble metals. However, catalysts immersed in excess liquid are very difficult to handle and are only useful for single bed reactors because they are impossible to load into most multi-bed reactors.

EXAMPLE 2

Ex-Situ Reduction and Passivation

In ex-situ reduction, the supported noble metal oxides are first dried and reduced in a single step in the presence of a mixture of hydrogen and inert gas in a rotary calciner. As shown in Table 2, oxygen chemisorption results on the nitrogen blanketed samples following ex-situ reduction in a rotary calciner show that the catalyst was fully reduced with no agglomeration of noble metals.

The air-passivated catalyst was prepared by cooling the reduced catalyst in nitrogen and then slowly exposing the reduced catalyst to air at room temperature. In this step, oxygen is absorbed onto the catalyst surface preventing oxidation of the reduced noble metals. Oxygen chemisorption measurement (0.01 O/M) shown in Table 2 indicates that the noble metal sites are covered with oxygen. Further, chemisorption experiments also indicate that the oxide coating can be easily removed at very mild conditions (>35° C. in hydrogen) to expose fully reduced and highly dispersed, active noble metal sites.

The oil pore-filled passivated catalyst was prepared, under inert gas (N2), using a oil pore-filled passivation technique. In this case, medicinal grade white oil was added to the reduced catalyst to fill about 95% of the pores volume. Reduced catalyst samples passivated with oil could not be analyzed by oxygen chemisorption.

TABLE 2

Metal Dispersion of Ex-Situ Reduced Catalyst

| Passivation Medium $H_2$ Treatment Temperature | Oxygen Chemisorption, O/M | |
|---|---|---|
| Prior to Chemisorption | Nitrogen | Air |
| None | 0.70 | 0.01 |
| 35° C. | 0.69 | 0.65 |
| 50° C. | 0.76 | 0.72 |
| 250° C. | 0.68 | 0.68 |

EXAMPLE 3

Evaluation of Ex-situ Reduced and Dry Passivated Catalysts

The reduced and passivated catalyst samples from Example 2 were loaded into a pilot plant reactor and theperformance of each catalyst was evaluated for hydrofinishing a hydrotreated 600N dewaxed oil. The dewaxed oil was previously hydrotreated to reduce the sulfur content to about 200 wppm.

Approximately 5 cc of three, ex-situ reduced and passivated noble metal catalysts were loaded into an upflow microreactor. These included noble metal catalysts that were all ex-situ reduced and passivated by (1) immersion in excess oil, as currently practiced, (2) exposure to ambient air or (3) pore filing with mineral oil. The catalysts were heated to 150° C. in hydrogen with 2 psi water partial pressure, simulating a typical commercial start-up with recycled hydrogen and treat-gas scrubbing. Oil feed was then started and operating conditions were adjusted to 2 LHSV, 1000 psig, and 2,500 scf/bbl. Reactor temperature was increased to 275° C. and then held constant for about 7-10 days. Hydrogen purity was 100% and no gas recycle was used.

For comparison, a sample of commercial catalyst was reduced in-situ, and performance was then evaluated for hydrofinishing the same 600N dewaxed oil. In this case, the catalyst was loaded using the same procedure and then dried in nitrogen at 260° C., cooled to room temperature, reduced in dry hydrogen at about 260° C., and then cooled to 150° C. This sequence represents a "best case" for a perfect in-situ reduction of the noble metal catalyst. Then oil feed was introduced and operating conditions were adjusted as described above.

Product quality as defined by aromatics, sulfur, and nitrogen contents was monitored daily. Aromatics were measured by UV absorption (mmoles/kg). Total aromatics as a function of time on stream are shown in FIG. 1. As shown, the initial aromatic saturation (arosat) performance of all ex-situ hydrogen reduced and passivated catalysts are equivalent to, or better than, the in-situ reduced catalyst. Further, the samples that were ex-situ reduced and dry passivated, either with air or by filling the pores with oil, had better aromatic saturates performance than the ex-situ reduced sample that was passivated by immersion in white oil.

Advantage of Dry Oil Over Air Passivated

The example below compares the performance of the two dry passivated catalysts of Example 2, air and oil pore-filled to protect the reduced noble metals, under more severe start-up conditions. In addition to passivation of the reduced metals, the oil pore-filled technique also offers the advantage of minimizing water adsorption by the catalyst during storage and handling, and therefore reducing water evolution during start-up and further mitigating the risk for metal sintering.

Hydrotreated dewaxed oil was used as the process feedstcock for catalyst evaluation. This oil is a dewaxed oil (−18° C.) containing traces level of sulfur (4.7 wppm) and approximately 5.5 wt % aromatics (124 mmol/kg).

EXAMPLE 4

Oxide Catalyst

The wet-gases treatment on the oxide catalyst was a base case against which air and oil passivated catalyst performance was compared. The noble metal catalyst in its oxide state was subjected to a drying step (140° C.) and a reduction step (220° C.) with wet gases containing about 2.2 psia water partial pressure. Previous studies have shown that under these reduction conditions metal sintering will occur resulting in a lower performing catalyst.

Towards the end of the wet gases treatment, and as the unit conditions were changed, the catalyst was subjected to an increase in water partial pressure to 3.5 psia for about 1 hour, at 150° C., prior to switching to dry hydrogen. The unit pressure was then slowly increased to 2000 psig operating pressure, and the dewaxed oil was introduced. Subsequently, reactor temperature was increased to the operating temperature of 220° C.

In addition, catalyst performance was again compared to the performance of the oxide catalyst that was dried and reduced using the conventional pilot plant start-up with dry-gases. This catalyst was dried in $N_2$ at 150° C. and reduced in $H_2$ at 250° C. for 8 hours.

Figure 2:
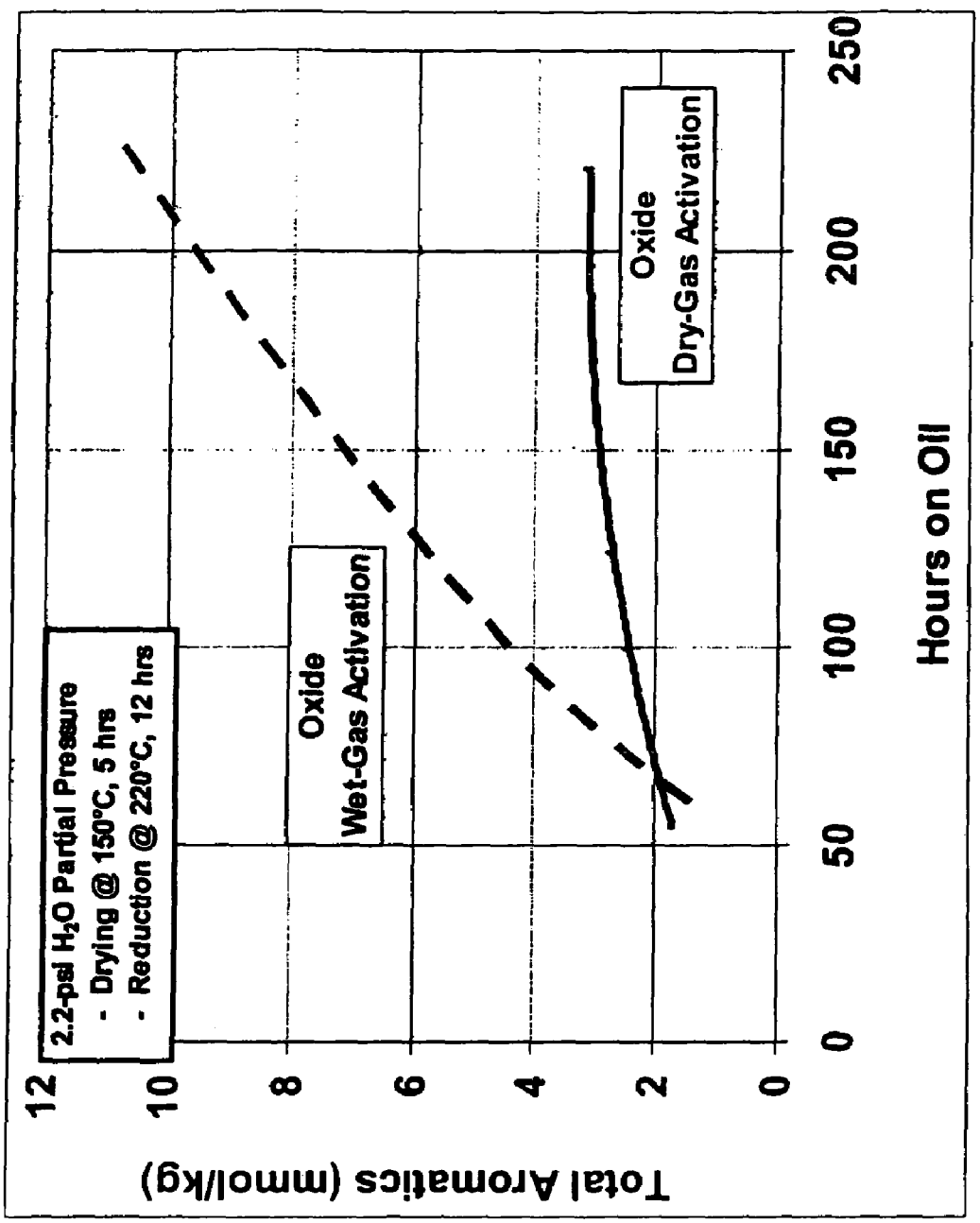
FIG. 2 shows the catalyst performance of Example 4.

As expected, treatment of the oxide catalyst with wet gases resulted in a lower performing catalyst than that for the dry treatment. The oxide wet and dry gases treated catalyst performances are summarized in Table 3 and FIG. 2.

TABLE 3

| | | Total Aromatics, mmol/kg | | % Hydrogenation | |
|---|---|---|---|---|---|
| MB # | Hrs on Oil | F-1 Oxide Wet N2-Wet H2 | F-2 Oxide Dry N2-Dry H2 | F-1 Oxide Wet N2-Wet H2 | F-2 Oxide Dry N2-Dry H2 |
| 1 | 56 | 1.705 | 1.756 | 98.63 | 98.58 |
| 2 | 78 | N/a | 2.193 | N/a | 98.23 |
| 3 | 101 | 5.262 | 2.892 | 95.76 | 97.67 |
| 4 | 124 | 5.973 | 3.201 | 95.18 | 97.42 |
| 5 | 148 | 6.911 | 3.394 | 94.43 | 97.26 |
| 6 | 172 | 9.133 | 3.567 | 92.64 | 97.12 |
| 7 | 196 | 10.631 | 3.803 | 91.43 | 96.93 |

EXAMPLE 5

Air and Oil Pore-Filled Passivated Catalysts

The air and oil pore-filled reduced and passivated catalysts were all subjected to wet-gas treatment. Two reactors were loaded with the air-passivated catalyst. One catalyst was subjected to a 2 hours drying step (140° C.) and a 16 hours reduction step (140° C.) with wet gases containing about 1-psia water partial pressure. The second air-passivated catalyst was directly reduced with wet hydrogen at 140° C. for 16 hours, eliminating the drying step.

Two other reactors were loaded with the oil pore-filled passivated catalyst in, either extrudates or crush form. The two reactors were maintained under a static dry nitrogen pressure (200 psig) while the other catalysts were treated. Wet hydrogen (1-psia) was processed over the oil pore-filled passivated catalyst for about 4 hours at 140° C. before switching to dry hydrogen gas.

Results

Figure 3:
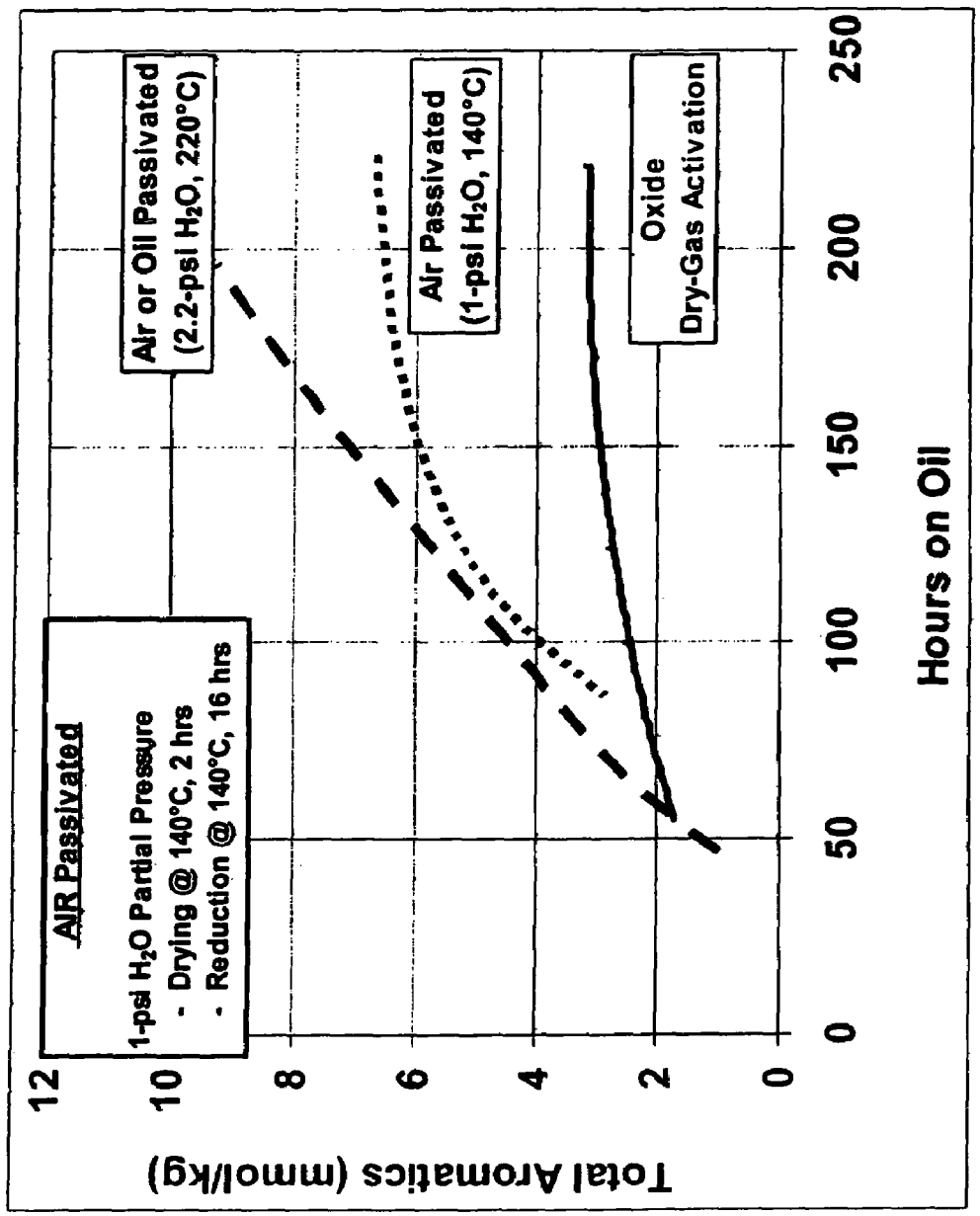
FIG. 3 shows the air passivated catalyst performance of Example 4.

FIG. 3 and Table 4 indicate lower performance of the air FIG. 3 and Table 4, indicate lower performance of the air passivated catalysts when treated with wet nitrogen and hydrogen. It is clear that the catalyst activity is significantly lower to that of the catalyst dried and reduced with dry gases.

The hydrogenation performance of the air-passivated catalyst subjected to wet hydrogen only was found to be marginally higher than that of the oxide catalyst of Example 4 treated with wet nitrogen and wet hydrogen.

TABLE 4

| | | F-1 Red./Air Pass. Wet N$_2$-Wet H$_2$ Crushed | | F-2 Red./Air Pass. No N$_2$-Wet H$_2$ Crushed | | F-3 Red./OilPass. No N$_2$-Wet H$_2$ (short) Crushed | | F-4 Red./Air Pass. No N$_2$-Wet H$_2$ (short) Extrudate | |
|---|---|---|---|---|---|---|---|---|---|
| WB # | Hrs on Oil | T. Aromatics (mmol/kg) | % Hydrogenation | T. Aromatics (mmol/kg) | % Hydrogenation | T. Aromatics (mmol/kg) | % Hydrogenation | T. Aromatics (mmol/kg) | % Hydrogenation |
| 1 | 104.4 | 3.611 | 97.09 | 3.526 | 97.16 | n/a | n/a | 1.756 | 98.58 |
| 2 | 128.4 | 5.176 | 95.83 | 4.940 | 96.02 | 2.941 | 97.63 | 2.193 | 98.23 |

TABLE 4-continued

| | | F-1 Red./Air Pass. Wet N$_2$-Wet H$_2$ Crushed | | F-2 Red./Air Pass. No N$_2$-Wet H$_2$ Crushed | | F-3 Red./OilPass. No N$_2$-Wet H$_2$ (short) Crushed | | F-4 Red./Air Pass. No N$_2$-Wet H$_2$ (short) Extrudate | |
|---|---|---|---|---|---|---|---|---|---|
| WB # | Hrs on Oil | T. Aromatics (mmol/kg) | % Hydrogenation | T. Aromatics (mmol/kg) | % Hydrogenation | T. Aromatics (mmol/kg) | % Hydrogenation | T. Aromatics (mmol/kg) | % Hydrogenation |
| 3 | 151.3 | 6.458 | 94.79 | 5.431 | 95.62 | 1.512 | 98.78 | 2.892 | 97.67 |
| 4 | 174.2 | 6.861 | 94.47 | 5.934 | 95.21 | 1.734 | 98.60 | 3.201 | 97.42 |
| 5 | 196.5 | 7.042 | 94.32 | 6.314 | 94.91 | 1.804 | 98.55 | 3.394 | 97.26 |
| 6 | 219.4 | 7.275 | 94.13 | 6.437 | 94.81 | 1.910 | 98.46 | 3.567 | 97.12 |
| 7 | 242.3 | 7.488 | 93.96 | 6.352 | 94.88 | 2.070 | 98.33 | 3.803 | 96.93 |
| | | Increased Temp, to 300° C. under H$_2$ flow (no oil flow) - 12 hrs at 300° C. and back to 220° C. Feed in at 220° C. | | | | | | | |
| 8 | 260.1 | 4.799 | 96.13 | 3.906 | 96.85 | 1.287 | 98.96 | 2.553 | 97.94 |
| 9 | 289.6 | 5.886 | 95.25 | 5.467 | 95.59 | 2.180 | 98.24 | 3.955 | 96.81 |
| 10 | 308.7 | 6.04 | 95.13 | 5.477 | 95.58 | 2.392 | 98.07 | 4.440 | 96.42 |

Figure 4:
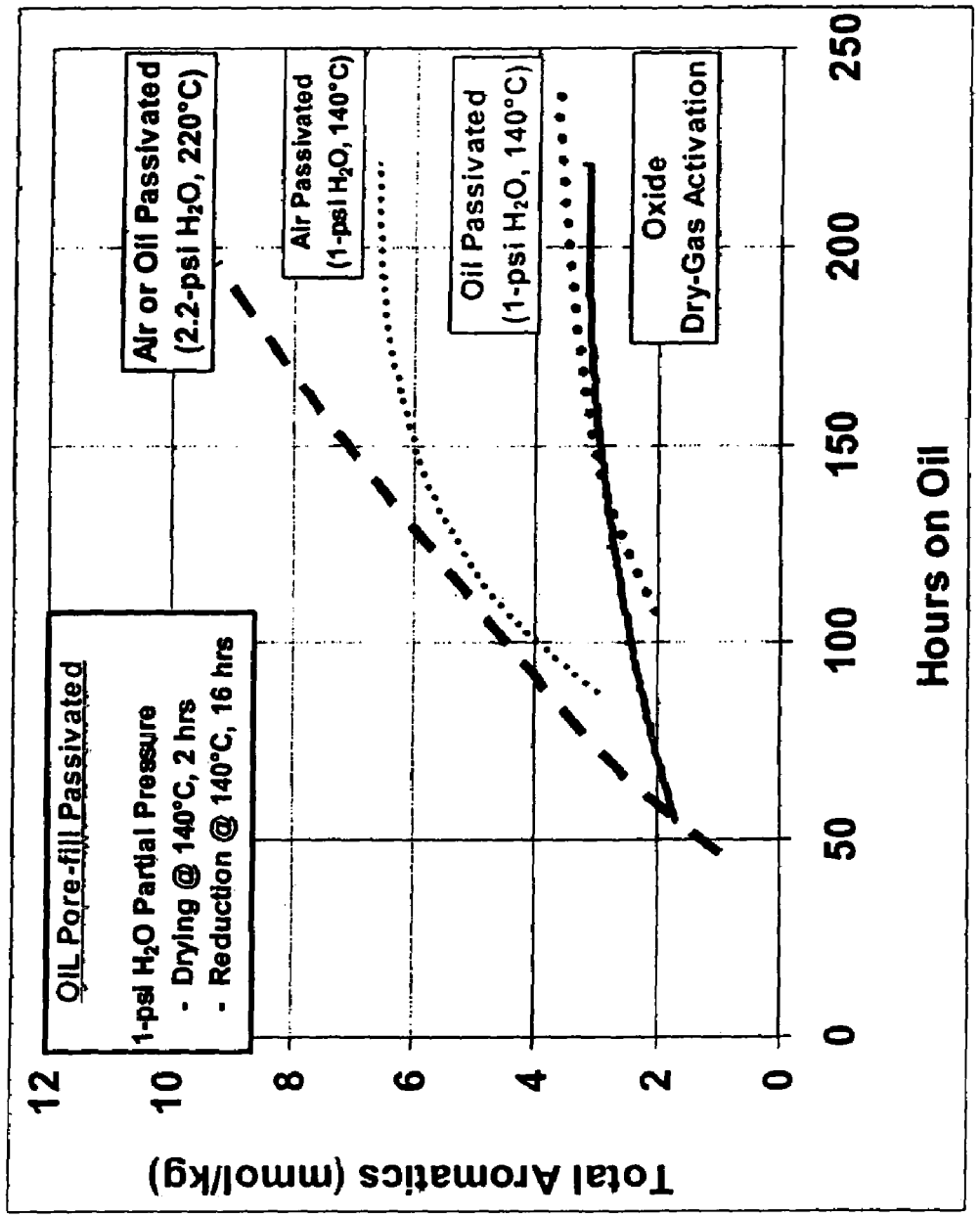
FIG. 4 shows the oil pore-filled catalyst performance of Example 5.

FIG. 4 and Table 4, show that oil pore-filled passivated catalyst performance is similar to that of the oxide catalyst of Example 4 dried and reduced following the conventional pilot plant procedure, using dry gases. These results would indicate that no significant metal sintering occurred and that the active metal was fully accessible for the hydrogenation reaction.

The small performance differences observed between the extrudates and the crush catalysts could be a result of a better packing when using crushed catalyst in the small diameter reactor or perhaps mass transfer restrictions.

What is claimed is:

1. A process for ex-situ reduction and dry passivation of a supported noble metal oxide catalyst having pores and including a mesoporous or zeolitic matrix comprising
   (a) reducing said catalyst in the presence of hydrogen and inert gas, to produce a reduced catalyst,
   (b) passivating the reduced catalyst so that the catalyst remains dry and free flowing by a process including cooling in an inert atmosphere and filling the pores of the catalyst with oil, in the absence of excess liquid.

2. The process of claim 1 wherein said inert atmosphere is nitrogen.

3. The process of claim 1 wherein said oil is white oil.

4. The process of claim 1 wherein said oil is paraffinic oil.

5. The process or claim 1 wherein said oil is a low sulfur distillate.

6. The process of claim 1 wherein said catalyst is palladium and platinum supported on MCM-41.

7. The process of claim 1, wherein said noble metal is palladium and platinum.

8. A process for ex-situ reduction and dry passivation of a supported noble metal oxide catalyst having pores and including a mesoporous or zeolitic matrix comprising
   (a) reducing said catalyst in the presence of hydrogen and inert gas, to produce a reduced catalyst,
   (b) passivating the reduced catalyst so that the catalyst remains dry and free flowing by a process including cooling in an inert atmosphere and exposing the catalyst to air.

9. The process of claim 8, wherein said noble metal is palladium and platinum.

10. The process of claim 8, wherein said catalyst is palladium and platinum supported on MCM-41.

\* \* \* \* \*